Dec. 30, 1947.  W. L. BARTHOLOMEW  2,433,822
LOGGING CART
Filed June 27, 1945  3 Sheets-Sheet 1
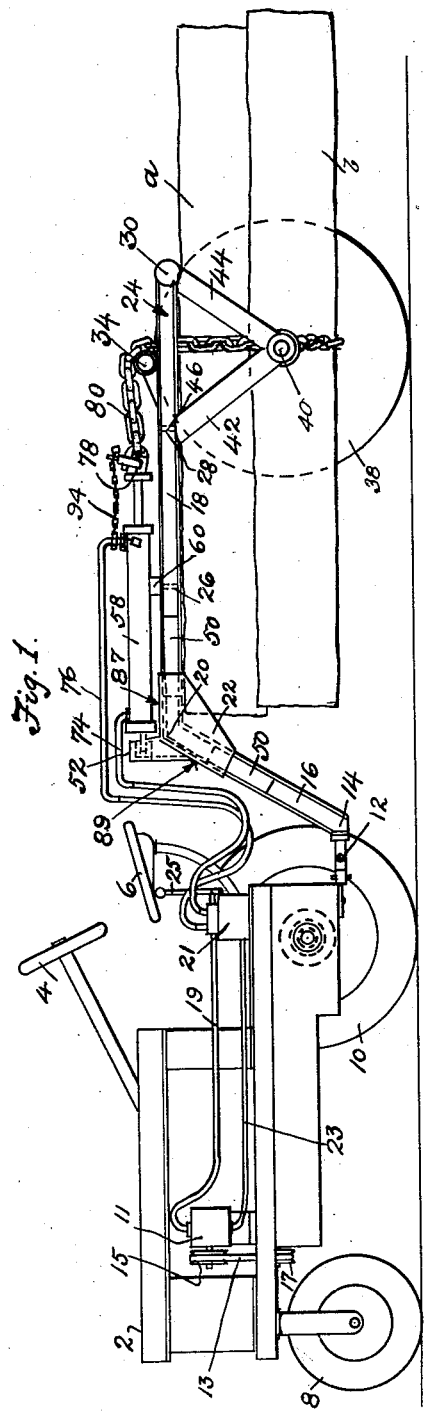
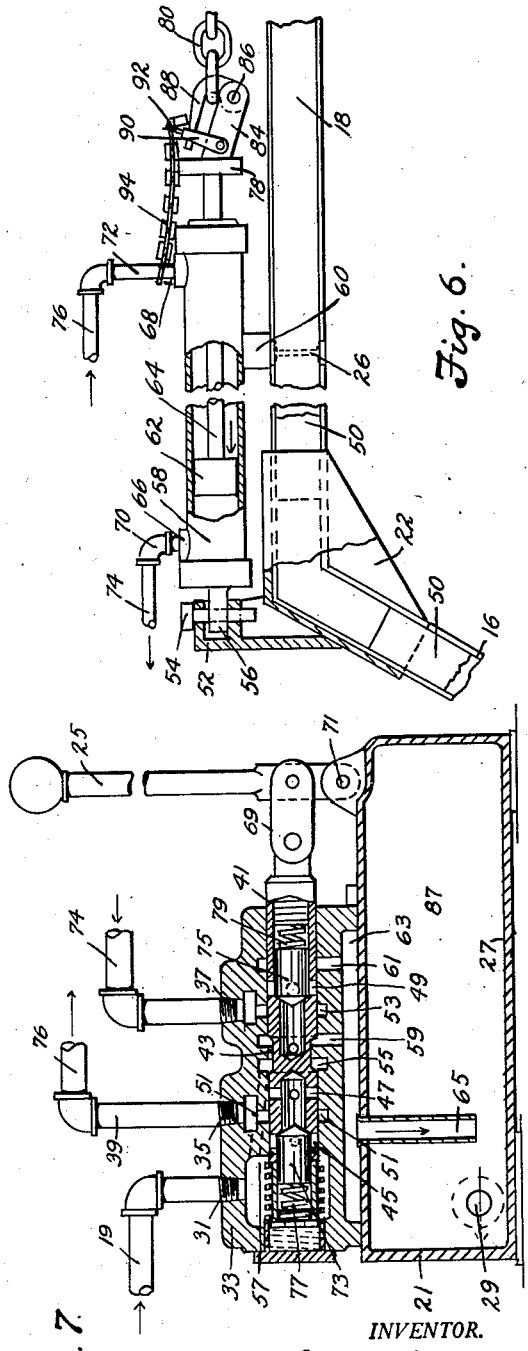
INVENTOR.
Wm L. Bartholomew
BY Arthur Scrivener
atty.

Dec. 30, 1947. W. L. BARTHOLOMEW 2,433,822
LOGGING CART
Filed June 27, 1945 3 Sheets-Sheet 2
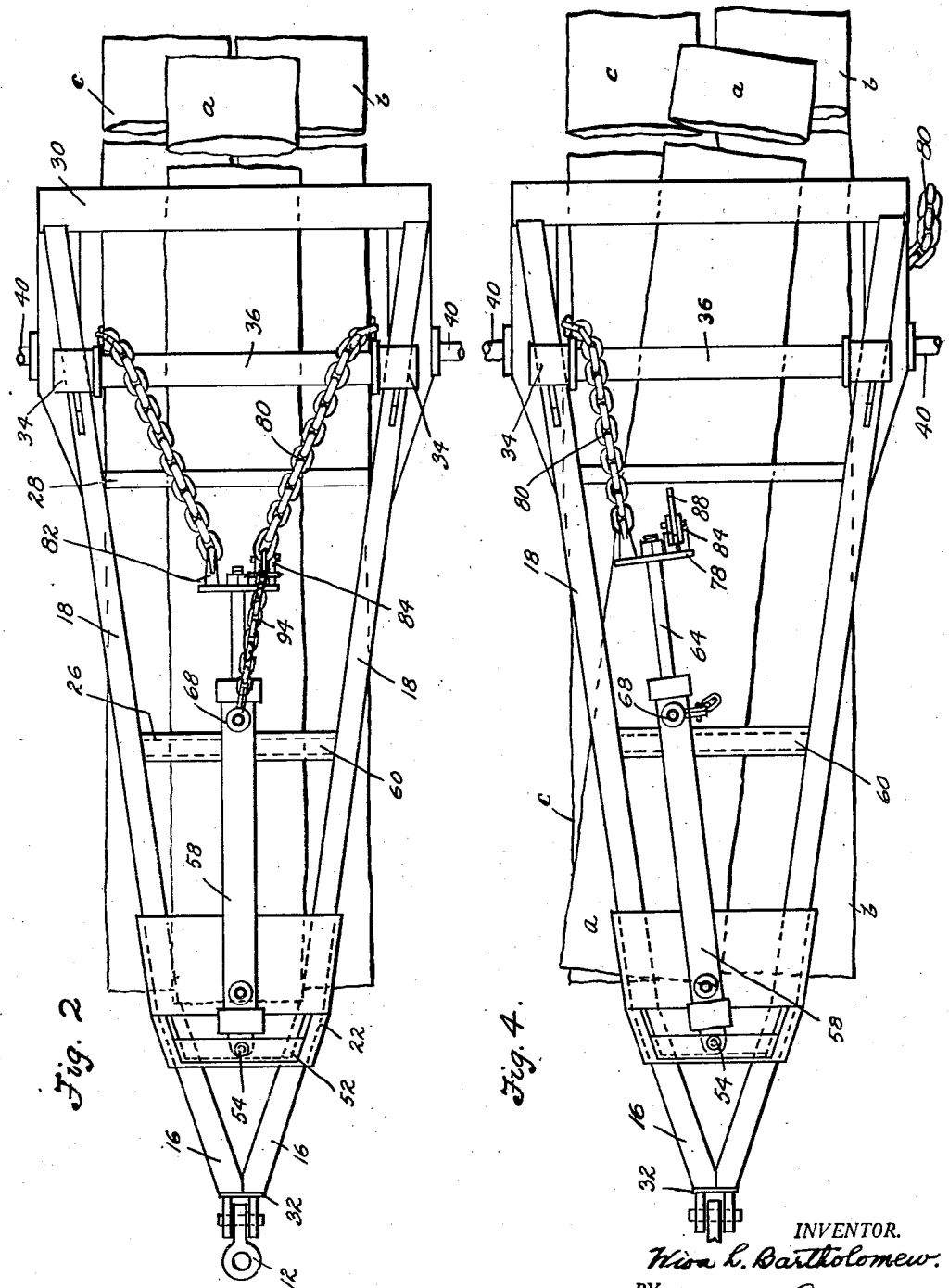
INVENTOR.
Wm. L. Bartholomew.
BY Arthur Scrivener
Atty.

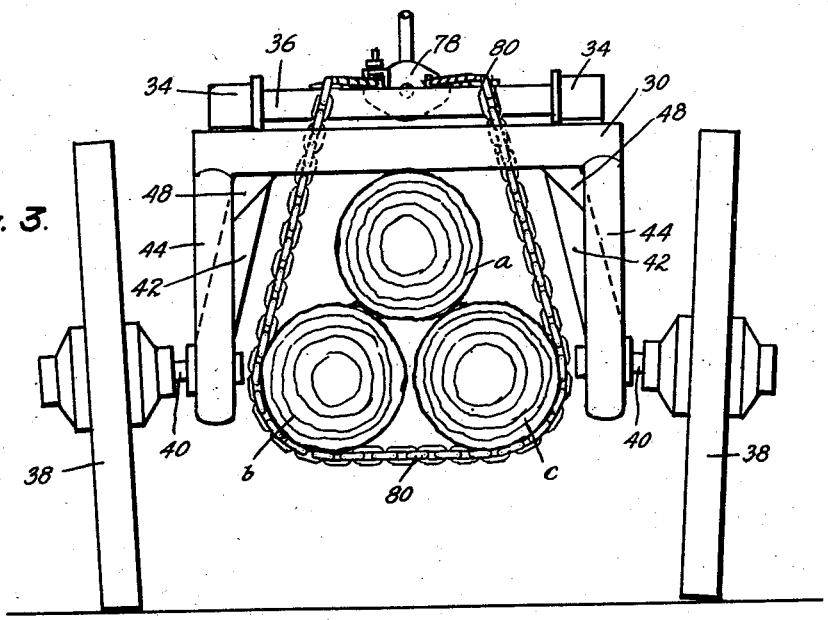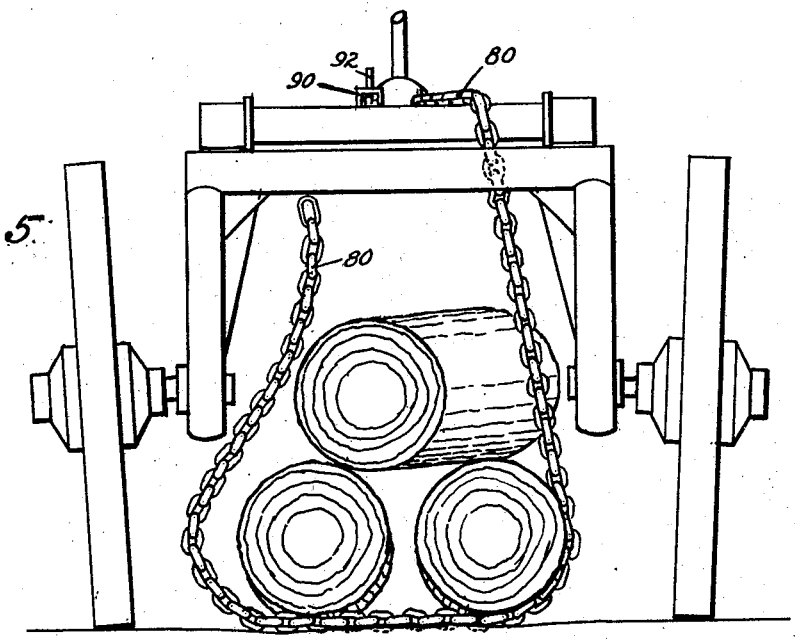

Patented Dec. 30, 1947

2,433,822

UNITED STATES PATENT OFFICE 2,433,822

LOGGING CART

Wion L. Bartholomew, Richmond, Va.

Application June 27, 1945, Serial No. 601,793

5 Claims. (Cl. 214—65.3)

My invention relates to vehicles used for lifting and carrying heavy loads, such as timber, poles, pipes; and it particularly relates to vehicles known as logging carts, used for carrying logs from the woods.

The object of my invention is to provide a logging cart which, in one cycle, that is, in the lifting, carrying, and dropping of the load shall require a minimum of time, labor, and expense; and which shall be simple in its construction, rugged, easy to operate and to keep in good repair; and which shall require little financial outlay.

My logging cart is constructed so that it may be drawn by a small tractor; the engine of which shall power the lifting of the logs, and transporting them to their destination; the whole operation being performed by one man.

In the drawings, which form a part of this specification:

Figure 1 shows, in side elevation, my logging cart carrying a load of logs, and being hauled by a tractor.

Figure 2 shows the cart in plan, with suspended load.

Figure 3 is a rear end elevation of the cart, with suspended load.

Figure 4 shows the cart in plan, after the load has been dropped.

Figure 5 is a rear end view of the cart after dropping the load.

Figure 6 shows in part side elevation and part section the forward end of the cart.

Figure 7 shows in part vertical section and part side elevation a valve for controlling the direction of the lifting force.

In Figure 1 the numeral 2 indicates the engine hood of a farm tractor; 4 the steering wheel; 6 the driver's seat; 8 the front and steering wheel; and 10 the offside driving wheel. The nearside driving wheel has been removed so that parts located behind it may be seen.

To the rear end of the tractor frame there is connected by a shackle 12 or other suitable means the tongue 14 of the cart.

The tongue and upper members of the cart are constructed of I-beams 16 and 18, connected by welding at the knee 20; and stiffly braced by the heavy steel knee-cap 22. See also Figures 2 and 4.

For identification I will refer hereinafter to the cart, in general terms, by the numeral 24.

The upper beams 18 of the cart 24 are spaced apart and braced by the horizontal members 26 and 28, and by the tubular cross member 30. At the tongue 14 of the cart the beams 16 are brought together; then welded to the end plate 32, to which a part of the connecting shackle 12 is pivoted.

On the beams 18 are set the two bracket bearings 34, 34, in which the roller 36 is loosely journaled. The outer ends of the brackets 34 are preferably closed, to hold the roller 36 in endwise place. Roller 36 is free to turn.

Cart 24 is supported on heavy wheels 38. In Figure 1 only the offside wheel is shown. Each wheel is carried on an axle 40, fixed at the point of the V-shaped bracket formed at the junction of tubes 42 and 44. These two tubes are welded together, and also to beam 18 at 46 and cross member 30, which is preferably tubular. This cross member is also braced by gusset-plates 48; Figs. 3 and 5. The frame is further strengthened, without adding much to its weight, by welding plates 50 to the beams 16 and 18 at points subjected to severe strain. These plates are welded to the outside edges of the flanges of the beams, thus transforming the I-beams at these points into triple-webbed box girders; a form sufficiently rigid to carry a heavy load over rough ground.

Refer now to Figures 1, 2, 4, and 6: Welded to the knee-cap 22 is a heavy bracket 52, on which is pivoted, by pin 54, the tongue 56 forming the end of the hydraulic cylinder 58. The weight of this cylinder may be carried also by a cross-member 60 made of any suitable material, metal or wood. I have shown a single piece of scantling; which affords a suitable surface, and can be readily renewed. This I preferably place over the frame brace 26; to which it may be secured.

In Figure 6: A piston is indicated at 62; a piston rod at 64; and inlet and outlet ports to the cylinder at 66 and 68. Each one is in turn an inlet or an outlet during the lifting and dropping of a load. To the ports 66 and 68 there is attached suitable piping—70 and 72 respectively—to which is attached flexible tubing 74 and 76 (Figure 1).

At the outer end of the piston rod 64 is a head 78 (Figs. 2, 4, and 6). To this head a chain 80 may be connected. At one end of the head 78 is a hook 82, over which a link of chain 80 may be dropped. The chain then leads over the roller 36, around the load of logs—shown in the drawing by logs $a$, $b$, and $c$—then up again and over roller 36, to the releasing-hook 84, which is welded to head 78. See also Figure 6. In this type of hook the hooking part is pivoted at 86, and its outer end 88, after the chain link is placed and the hook is closed upon it, is held by means of the bridle 90. On this bridle is a projecting pin 92 over which a link of a small chain 94 (Figure 6) may be dropped. Its other end may be attached to any fixed part of the structure forward of the hook 84. In the drawing it is shown looped around and held on the pipe 72. Let it be understood that the end links of chains 80 and 94 are not necessarily the links to be held by hooks or by projecting pin 92. The hooks 82, 84, and the projecting pin 92 and their respective associated chains are so designed that any link of the latter may be thrown over its associated hook or pin. By this arrangement time is often saved. For instance; in the case of chain 94: we do not have to find an end link. One end of the chain is looped around pipe 72; we take out the slack, and throw the nearest link over pin 92 of bridle 90. Time may be saved in the same way when arranging chain 80. This chain may be longer than is shown in the drawings; the end links extending beyond the hooks 82 and 84.

In Figures 2 and 3 the load of logs is shown held up snugly against the underside of the frame of cart 24. In Figures 4 and 5 the chain 94 has been pulled until the releasing hook 84 has been tripped. The chain 80, now held only by hook 82, has dropped the load. Usually the drop is so sudden that the logs lie in nearly the same relative positions as when suspended; though sometimes an upper log may be jumped a little out of line, as suggested in Figures 4 and 5.

The load having been dropped: the logger drives the tractor and the cart 24 ahead. Chain 80 may then be detached from hook 82, or it may be left on hook 82 and be pulled from under the logs.

In general operation: chain 80 is passed around a load of logs arranged in skids or ties; or it may be placed first upon the ground, and then the logs upon it. The piston 62 is driven to the rear end of the cylinder 58. One end of chain 80 is then passed over roller 36, and is looped over hook 82 on head 78. The free end of chain 80 is then lifted, passed over roller 36, and one of its links is looped over releasing-hook 84. The hook is closed, and bridle 90 is swung into position to hold the free end 88 of hook 84.

Pressure is now exerted against the rear end of piston 62, which is driven toward the forward end of cylinder 58; pulling forward piston rod 64, head 78, and chain 80, which, rising over roller 36, lifts the load. If the load is low, and the required lift is greater than the stroke of piston 62, the logger packs under the load, and rearranged chain and lifting gear. As a rule the piston stroke is longer than the lift.

The pressure in cylinder 58 against piston 62 is great enough to sustain any load which can be carried by the cart 24 and held snugly up under the frame knee-cap 22 and cross-members 26, 28 and 30.

A link of chain 94 may be looped over pin 92 of the bridle 90 before the load is moved, or upon arrival of the load at its destination. When the man-power is limited to one individual, time is saved by arranging chain 94 over pin 92 before the load is moved.

On arrival at his destination, the logger sees that the chain 94 is properly looped over pin 92. He does not have to go near the load to drop it; and so be in danger if any part of the load should be thrown to the side. Without leaving his driver's seat on the tractor, he operates the liquid control to release the pressure on the rear of piston 62. The weight of the load pulls the piston rod head 78 rearwardly; the small chain 94 tightens, pulls bridle 90 off arm 88 of hook 84; chain 80 is freed from the hook; the load is dropped; and the logger drives his tractor and cart 24 ahead. Before returning for another load, he may hitch up the loose end of chain 80; but in the woods he need not stop to do even that.

The action of the liquid, preferably oil, in cylinder 58 is controlled from the driver's seat in the following manner:

On the chassis of the tractor there is mounted a rotary pump 11. This pump is driven by the tractor engine through belt 13 running over pulleys 15 and 17. The pump pressure line 19 carries the oil to a control box 21, to be described later. From control box 21 oil returns to pump 11 by return line 23.

Assume that in Figure 6 the piston 62 and the chain 80 are sustaining a heavy load; the pressure oil entering by pipe 72 and pressing against the rear end of the piston 62. The hand lever 25 of the control box 21 (Figure 7) is in the neutral position. The load is held. The arrows in Figures 6 and 7 indicate the direction of the pressure at the moment. See Figure 1 for the flexible connections 74 and 76 between control box 21 and cylinder 58.

When the logger wishes to drop the load he pushes the lever 25 backward. This moves the valve in the control box. The pressure on piston 62 is released. The oil flows through pipe 72 in a direction opposite to that indicated by the arrow. The dropping of the load upon the release of pressure has already been described.

Describing the working parts of the liquid pressure control: In the control box 21 (Figure 7) 87 is an oil tank; from which oil can pass by outlet 29 and return line 23 to pump 11.

The pressure outlet from pump 11 is connected to the valve-housing 33 by pipe 19 and port 31. This port, and ports 35 and 37 may be located on the side of the valve-housing 33; but for the purpose of illustration they are shown in the drawings on the top of the housing.

In port 35 is set a pipe 39, which is connected by flexible tube 76 with pipe 72 entering port 68 on cylinder 58. Port 37 on housing 33 is connected by flexible tubing 74 and pipe 70 with port 66 on cylinder 58.

Seated in the valve-housing 33 is the cylindrical valve 41; of hollow construction except at a point near the center of its length. Near this point the valve is reduced in diameter to form the port 43.

In the hollow valve are circumferential ports 45, 47, and 49; each drilled at two or more points on the circumference of the valve.

In the valve seat in housing 33 are port 51, connected with outlet port 35; port 53 connected with outlet port 37; port 55 connected by passage 57 with inlet port 31; and ports 59 and 61 connected with chamber 63, which in turn is connected through tube 65 with tank 87.

Valve 41 is connected by link 69 with hand lever 25; the said lever being pivoted at 71 on tank 87.

Within valve 41 are check valves 73 and 75, pressed on their respective seats by springs 77 and 79.

In Figure 7, valve 41 is shown in its neutral position; with oil pressure on the rear of piston 62 sustaining the load. This pressure originated at pump 11; and was communicated to piston 62 through pipe 19, port 31, port 55, port 47, passage 81, past check valve 73, through port 45 to port 51, to port 35, and by pipes 39, 76 and 72 to the rear end of cylinder 58. As soon as the load is lifted, the valve 41 is brought to the position shown in Figure 7, in which port 51 is closed, and port 55 is connected by valve-port 43 with port 59, chamber 63, tube 65 to tank 87; and the oil returns by port 29 to pump 11. The pump is now working against zero pressure-head.

When the logger wishes to drop his load, he pushes the hand-lever 25 forward; thereby shifting valve 41 forward until the oil pressure in line 72, 76, is relieved through ports 35, 51, 47, check-valve 73, port 45, and thence into a cored passage connected to chamber 63 and return tank 87.

The pressure on the rear of piston 62 is relieved; the weight of the load pulls on head 78, increasing the distance between the head and pipe 72 to which chain 94 is hitched; the bridle 90 is pulled off the release-hook 84, which flies open and frees chain 80, instantly dropping the load.

The knee-cap 22 has a double purpose. It greatly strengthens the joint between the upper frame of the chassis and the tongue; that is between the side members 18 of the chassis and the side members 16 of the tongue. Its upper plate 27 forms an abutment against which the forward end of the uppermost log of a load may strike; but also, in case of a slight slackening of the load-lifting chain, and a possible sliding forward of the uppermost log, the forward movement of the said log will be stopped by its end coming into contact with the inclined front plate 89 of the knee-cap. This is a protection to the driver of the tractor.

I claim:

1. In a logging cart with open under-carriage, the combination of a high chassis having side members spaced apart by cross members; depending and opposite brackets on either side; wheels supported on axles attached one to each bracket; bearings oppositely supported on the side members of the chassis adjacent the vertical plane passing through the centers of the wheels; a roller rotatably mounted in and adapted to rotate freely in the bearings; fluid-pressure hoisting means supported on the forward part of the chassis; a hoisting chain releasably connected at its two ends with the hoisting means and passing over and depending from the roller; and means for freeing the hoisting chain automatically from the hoisting means by controlling the fluid pressure in the hoisting means to reduce the tension on the hoisting chain.

2. In a logging cart with open under-carriage, the combination of a high chassis having side members spaced apart by cross members; a tongue depending from the forward end of the chassis; a knee-cap embracing the joint between the chassis and the tongue and extending downward on each side to form an inverted cup to receive and to restrain side movement of a log; and means for lifting a log to the underside of the chassis.

3. In a logging cart with open under-carriage, the combination of a wheel supported high chassis; a pivot mounted vertically adjacent the forward end of the chassis; a fluid-pressure cylinder mounted on the pivot and adapted to swing on the pivot in a plane substantially parallel with the plane of the chassis; a piston adapted to operate within the cylinder; a piston rod extending from the cylinder at the end opposite to that of the pivotal support; a hoisting chain releasably attached adjacent its ends to the end of the piston rod; means for introducing fluid-pressure within the cylinder to operate the piston and rod to exert tension on the chain to raise the load; means for releasing the fluid-pressure on the piston and rod to reduce the tension on the chain; and means adapted to control the chain releasing means to release the chain and drop the load when the tension of the said chain is reduced.

4. In a logging cart: the combination of a wheel-supported chassis with open undercarriage; a fluid-pressure cylinder pivotally supported by its forward end adjacent the forward end of the chassis and adapted to swing on its pivot in a plane substantially parallel with the plane of the chassis; a piston operative within the cylinder; a piston rod extending rearwardly from the piston; a hoisting chain releasably connected adjacent its ends with the end of the piston rod and adapted to embrace the load in its bight; means for producing and controlling fluid-pressure within the cylinder; means for releasing the pressure of the fluid within the cylinder; a roller supported on the chassis and extending the full width of the open under-carriage to form a bearing for the hoisting chain; and means for automatically opening the chain releasing means to free the chain upon the reduction of the pressure of the fluid on the said piston.

5. In a logging cart: the combination of a chassis with open under-carriage; a fluid-pressure cylinder supported on the chassis; a piston operative within the cylinder; a piston rod extending from the piston; a hoisting chain releasably connected adjacent its ends with the piston rod; a releasing hook with bridle secured to the piston rod and adapted to hold an end of the hoisting chain; means for supplying fluid-pressure to the cylinder to put tension on the hoisting chain; means for controlling the said pressure to reduce the tension on the said chain; and means for connecting the bridle of the releasing hook with a substantially fixed point on the structure so that when the pressure is reduced on the piston to allow the piston rod to move outwardly from the cylinder the said connecting means will trip the bridle and so release the chain from the hook.

WION L. BARTHOLOMEW.

REFERENCES CITED

The following references are of record in the file of this patent:

UNITED STATES PATENTS

| Number | Name | Date |
|---|---|---|
| 854,601 | Perry | May 21, 1907 |
| 1,909,689 | Kuchar | May 16, 1933 |
| 1,945,976 | Nourse et al. | Feb. 16, 1934 |
| 2,058,473 | LeTourneau | Oct. 27, 1936 |
| 2,179,778 | Dempster | Nov. 14, 1939 |
| 2,261,509 | Williams | Nov. 4, 1941 |
| 2,361,181 | Dowd | Oct. 24, 1944 |